United States Patent
Rupp

(10) Patent No.: US 9,549,564 B2
(45) Date of Patent: Jan. 24, 2017

(54) MOBILE CONFECTIONARY EDIFICE OR CART HAVING TELESCOPING UPPER STORAGE FOR EASE OF MOBILITY

(71) Applicant: Snowie LLC, Salt Lake City, UT (US)

(72) Inventor: Carl A. Rupp, Salt Lake City, UT (US)

(*) Notice: Subject to any disclaimer, the term of this patent is extended or adjusted under 35 U.S.C. 154(b) by 0 days.

(21) Appl. No.: 14/539,951

(22) Filed: Nov. 12, 2014

(65) Prior Publication Data
US 2015/0166089 A1    Jun. 18, 2015

Related U.S. Application Data

(60) Provisional application No. 61/903,222, filed on Nov. 12, 2013, provisional application No. 61/942,534, filed on Feb. 20, 2014.

(51) Int. Cl.
*A23G 9/00* (2006.01)
*A23G 9/22* (2006.01)
*B62B 1/10* (2006.01)

(52) U.S. Cl.
CPC . *A23G 9/00* (2013.01); *A23G 9/22* (2013.01); *B62B 1/10* (2013.01)

(58) Field of Classification Search
CPC .......... A23G 9/25; B60P 3/0257; A47F 5/108; F25C 5/12; Y10S 241/17; B62B 1/10–1/125
See application file for complete search history.

(56) References Cited

U.S. PATENT DOCUMENTS

| | | | | |
|---|---|---|---|---|
| 589,971 | A * | 9/1897 | Kephart | E04H 1/1222 52/36.2 |
| 1,418,596 | A * | 6/1922 | Mensoian | B60P 3/0255 296/21 |
| 1,962,454 | A * | 6/1934 | Meanor | A47B 31/02 126/268 |
| D132,749 | S * | 6/1942 | Dinsmore | A47B 31/02 296/22 |
| 2,518,764 | A * | 8/1950 | Dunlap | F25D 25/00 108/106 |
| 2,552,933 | A * | 5/1951 | Browne | F25C 5/12 241/278.1 |
| 2,771,318 | A * | 11/1956 | Jagsch | B60P 3/0257 296/22 |
| 2,845,780 | A * | 8/1958 | Conklin | A47B 31/02 211/126.15 |
| 3,000,189 | A * | 9/1961 | Bert | F25C 1/00 241/101.2 |
| 3,388,943 | A * | 6/1968 | Clement | A47F 5/108 280/47.34 |
| 3,735,898 | A * | 5/1973 | Smith | B67D 1/06 222/129 |
| 3,874,531 | A * | 4/1975 | Mayo | B60D 1/00 280/47.35 |

(Continued)

*Primary Examiner* — Erez Gurari
(74) *Attorney, Agent, or Firm* — Terrence J. Edwards; TechLaw Ventures, PLLC

(57) ABSTRACT

The disclosure extends to methods, systems, and devices for producing a conditioned ice or snow cone products and providing toppings thereto in a mobile configuration. The system may comprise an ice shaving or snow cone machine, a mobile edifice, and a topping dispenser attached to the mobile edifice. The mobile edifice may comprise telescoping members for moving the edifice from an open position to a closed position and vice-versa.

22 Claims, 6 Drawing Sheets

(56) References Cited

U.S. PATENT DOCUMENTS

| | | | | |
|---|---|---|---|---|
| 4,270,319 A * | 6/1981 | Spasojevic | B60P 3/0257 | 296/22 |
| 4,276,750 A * | 7/1981 | Kawasumi | B67D 1/00 | 221/96 |
| 4,417,774 A * | 11/1983 | Bevan | A47F 9/00 | 312/108 |
| 4,739,580 A * | 4/1988 | Simmons | A47B 3/0818 | 108/50.13 |
| 4,919,075 A * | 4/1990 | Himi | B67D 1/08 | 118/15 |
| 5,027,698 A * | 7/1991 | Chirnomas | A23G 9/28 | 141/104 |
| 5,048,857 A * | 9/1991 | Stevens | B62B 3/10 | 108/167 |
| D326,024 S * | 5/1992 | Boyd | B62B 3/10 | 211/59.1 |
| 5,129,611 A * | 7/1992 | Grover | F16M 11/26 | 108/147 |
| 5,158,506 A * | 10/1992 | Kusano | A23G 9/163 | 62/136 |
| 5,367,452 A * | 11/1994 | Gallery | G06Q 10/087 | 705/28 |
| 5,551,774 A * | 9/1996 | Campbell | A47F 3/0439 | 312/114 |
| 5,626,353 A * | 5/1997 | Campbell | A47B 31/02 | 280/47.35 |
| 5,802,668 A * | 9/1998 | Gosselin | B60B 33/0039 | 16/35 R |
| 5,899,010 A * | 5/1999 | Peck | G09F 7/12 | 40/594 |
| 5,938,261 A * | 8/1999 | Faba | B60P 3/0257 | 296/22 |
| 6,012,660 A * | 1/2000 | Colman | F25C 5/12 | 241/100 |
| 6,131,929 A * | 10/2000 | Haley | A63F 9/001 | 280/47.34 |
| D443,069 S * | 5/2001 | Horton | G09F 17/00 | D25/16 |
| 6,263,688 B1 * | 7/2001 | Bedard | A47F 3/0408 | 62/237 |
| 6,267,111 B1 * | 7/2001 | Burton | B60P 3/0257 | 108/156 |
| 6,349,715 B1 * | 2/2002 | McBroom | F24C 15/18 | 126/276 |
| 6,389,836 B1 * | 5/2002 | Markin | A23G 9/045 | 241/92 |
| 6,474,097 B2 * | 11/2002 | Treppedi | A45C 11/20 | 280/30 |
| 6,495,238 B1 * | 12/2002 | Campbell | G09F 17/00 | 114/219 |
| D469,234 S * | 1/2003 | Bond | G09F 17/00 | D34/14 |
| 6,527,212 B2 * | 3/2003 | Rupp | A23G 9/045 | 241/293 |
| 6,611,972 B2 * | 9/2003 | Underbrink | A47K 1/02 | 4/619 |
| 6,634,668 B2 * | 10/2003 | Urffer, III | A47F 5/108 | 280/47.35 |
| 6,648,349 B1 * | 11/2003 | Waller | B62B 3/02 | 280/47.35 |
| 6,705,109 B2 * | 3/2004 | DeMars | F25D 3/08 | 62/457.2 |
| 7,052,062 B2 * | 5/2006 | Catt | A47F 9/00 | 222/610 |
| 7,284,393 B1 * | 10/2007 | Macmillan | B62B 1/22 | 62/331 |
| 7,441,286 B1 * | 10/2008 | Taylor Parker | A47K 1/02 | 280/652 |
| 7,441,783 B2 * | 10/2008 | Clark | B62B 3/001 | 280/30 |
| 7,618,251 B2 * | 11/2009 | Steiner | A23G 1/0066 | 222/439 |
| 7,665,398 B2 * | 2/2010 | Gerber | A23G 9/20 | 366/156.1 |
| 7,703,384 B2 * | 4/2010 | Annis | F24C 15/30 | 219/494 |
| 7,815,135 B2 * | 10/2010 | Kato | F25C 5/12 | 241/65 |
| 8,157,136 B2 * | 4/2012 | Lamb | B60P 3/0257 | 222/108 |
| 8,402,781 B2 * | 3/2013 | Cocchi | A23G 9/28 | 62/342 |
| 8,881,545 B2 * | 11/2014 | Lee | F25D 17/065 | 62/389 |
| 8,939,389 B2 * | 1/2015 | Rupp | F25C 5/12 | 241/36 |
| 9,022,414 B2 * | 5/2015 | Bell | B62B 3/002 | 186/57 |
| 9,263,869 B2 * | 2/2016 | Prince | H02B 1/52 | |
| 2001/0030446 A1 | 10/2001 | Lambright | B60P 3/34 | 296/156 |
| 2003/0025302 A1 * | 2/2003 | Urffer, III | A47F 5/108 | 280/651 |
| 2004/0000774 A1 * | 1/2004 | Zeuner | A47F 5/108 | 280/651 |
| 2004/0016772 A1 * | 1/2004 | Rupp | B67D 3/0048 | 222/108 |
| 2006/0228201 A1 * | 10/2006 | Lenceski | A63B 71/0036 | 414/466 |
| 2006/0273604 A1 * | 12/2006 | Luthe | A47J 31/4403 | 296/22 |
| 2008/0140437 A1 * | 6/2008 | Russo | G07F 17/0071 | 705/1.1 |
| 2008/0283102 A1 * | 11/2008 | Kelley | A45B 23/00 | 135/16 |
| 2011/0023505 A1 * | 2/2011 | Popov | A23G 9/04 | 62/89 |
| 2011/0204756 A1 * | 8/2011 | DeMars | A47F 9/00 | 312/140.2 |
| 2011/0310695 A1 * | 12/2011 | Sus | A23G 3/0065 | 366/177.1 |
| 2012/0199608 A1 * | 8/2012 | Cocchi | A23G 9/225 | 222/146.6 |
| 2012/0292885 A1 * | 11/2012 | Matyszyk | B64F 1/224 | 280/503 |
| 2012/0312049 A1 * | 12/2012 | Downs, III | A23G 9/20 | 62/340 |
| 2013/0098098 A1 * | 4/2013 | Ugolini | A23G 9/04 | 62/342 |
| 2014/0027471 A1 * | 1/2014 | Tollefson | B60P 3/0257 | 222/108 |
| 2014/0120235 A1 * | 5/2014 | Jones | A23G 9/28 | 426/565 |
| 2014/0239020 A1 * | 8/2014 | Lamb | B60P 3/0257 | 222/610 |
| 2015/0034668 A1 * | 2/2015 | Minard | A23G 9/281 | 222/1 |
| 2015/0060488 A1 * | 3/2015 | Rupp | A23G 9/28 | 222/108 |
| 2015/0097001 A1 * | 4/2015 | Gatipon | B67D 1/0857 | 222/108 |
| 2015/0166089 A1 * | 6/2015 | Rupp | A23G 9/00 | 280/651 |
| 2015/0166322 A1 * | 6/2015 | O'Sullivan | A23G 9/28 | 221/96 |
| 2015/0216201 A1 * | 8/2015 | Bruckner | A23G 9/283 | 700/233 |
| 2015/0264959 A1 * | 9/2015 | Colwell | F25C 5/12 | 241/25 |
| 2015/0267955 A1 * | 9/2015 | Rupp | A23G 9/045 | 241/36 |
| 2015/0289539 A1 * | 10/2015 | Noth | B01F 7/00458 | 222/1 |
| 2016/0044936 A1 * | 2/2016 | Tollefson | B60P 3/0257 | 222/144.5 |

* cited by examiner

MOBILE CONFECTIONARY EDIFICE OR CART HAVING TELESCOPING UPPER STORAGE FOR EASE OF MOBILITY

CROSS-REFERENCE TO RELATED APPLICATIONS

This application claims the benefit of U.S. Provisional Application No. 61/903,222, filed Nov. 12, 2013, and this application also claims the benefit of U.S. Provisional Application No. 61/942,534, filed Feb. 20, 2014, both of which are hereby incorporated by reference herein in their entireties, including but not limited to those portions that specifically appear hereinafter, the incorporation by reference being made with the following exception: In the event that any portion of the above-referenced provisional applications is inconsistent with this application, this application supersedes said above-referenced provisional applications.

BACKGROUND

The disclosure relates generally to mobile edifices and carts for use in preparing, dispensing and topping shaved ice or snow cone confectioneries, and more particularly, but not necessarily entirely, to a mobile edifice for use in providing shaved ice or snow cones prepared by a machine for that purpose and a topping dispenser that is readily movable to an event or from location to another location.

A variety of machines have been developed, described and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups. Dispensing the syrups as toppings to a usually unflavored ice product can be time consuming for workers. Additionally, most customers desire different levels or amounts of toppings or flavoring syrups. Thus, it is advantageous to make topping dispensers available for customer use such that a customer can flavor the base ice product themselves.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all of these matters form part of the prior art base, or were common general knowledge in the field relevant to the disclosure as it existed before the priority date of each claim of this disclosure.

SUMMARY OF THE DISCLOSURE

Disclosed herein are mobile apparatuses and mobile systems for the making and distribution of conditioned ice and/or frozen confections to a plurality of consumers in an efficient and cost effective manner. More particularly disclosed herein are embodiments of a significantly self-contained mobile confectionary cart that can be relocated to better serve the public.

An exemplary embodiment of a mobile conditioned ice and/or frozen confectionary cart may comprise a body portion having an enclosed storage compartment and a substantially horizontal work surface for holding an ice conditioning machine and a plurality of topping containers. The embodiment may further comprise a top portion located vertically with respect to the body portion that is connected to the body portion with a plurality of telescoping members disposed between the body portion to the top portion, whereby the mobile edifice is configured to be compacted vertically for ease of relocating the cart by operating the plurality of telescoping members. Additionally, a roller disposed on the body portion may be included so as to ease the process of moving the cart from sales location to sales location.

An exemplary embodiment of a system for providing conditioned ice and/or frozen confections at various locations may comprise a mobile edifice as discussed above having a body portion with an enclosed storage compartment and a substantially horizontal work surface for holding an ice conditioning machine and a plurality of topping containers, wherein a top portion located vertically with respect to the body portion is connected with a plurality of telescoping members disposed between, and connecting, the body portion to the top portion, whereby the mobile edifice is configured to be compacted vertically by operating the plurality of telescoping members. The system may further comprise an ice conditioning machine for producing conditioned ice that is in a state to desirably receive confectionary topping and a topping container for containing a topping for the conditioned ice.

In an implementation a substantially self-contained system may comprise a power source such as a battery or even a power cord that will supply power to such devices as an ice conditioning machine, a cash register, lighted signage, and the like.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
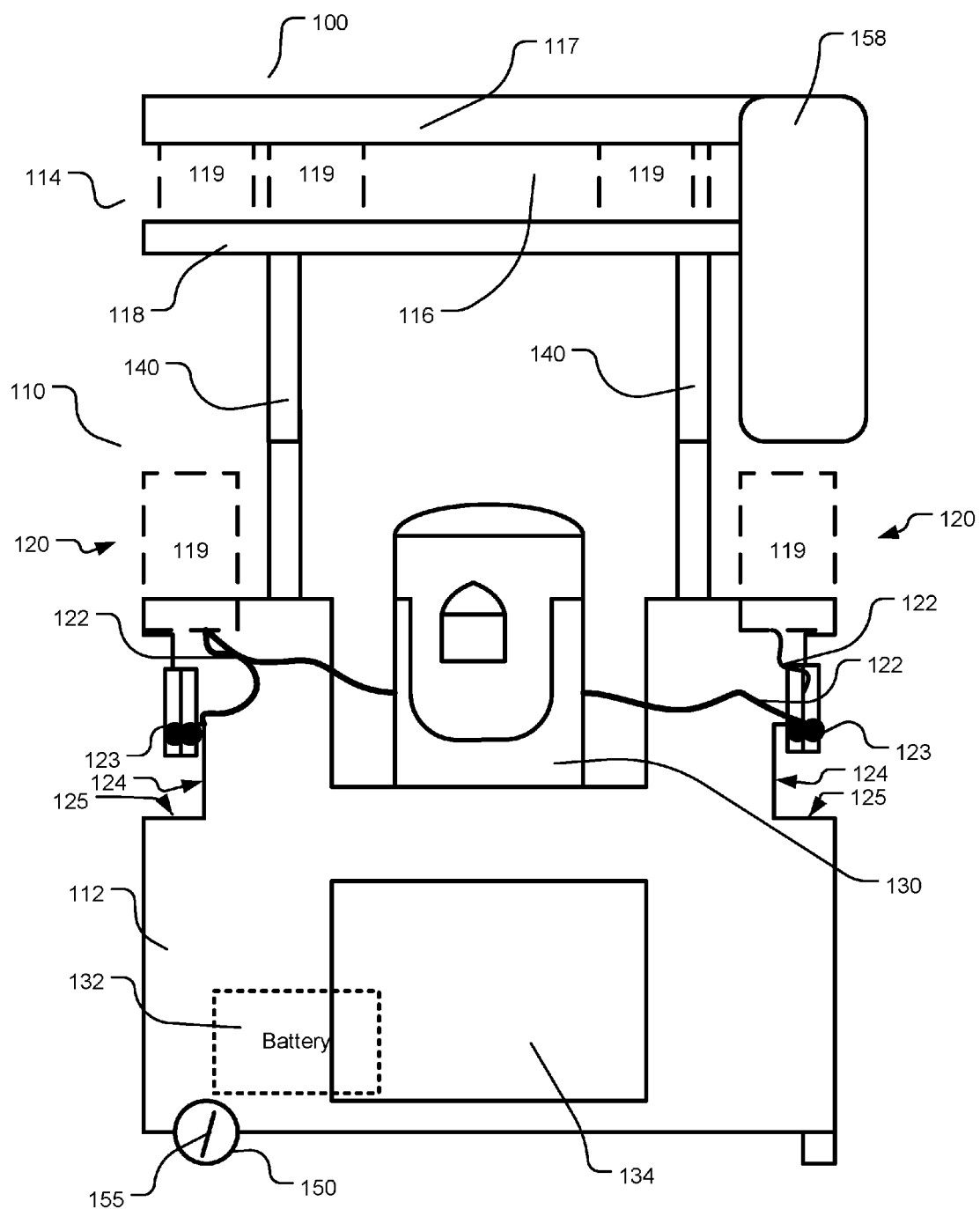
FIG. 1 illustrates an implementation of a mobile edifice and a topping dispenser for producing a conditioned ice and/or frozen confection product in accordance with the teachings and principles of the disclosure.

The disclosure extends to methods, systems, and devices for producing a conditioned ice and/or frozen confection product, which may be a shaved ice or snow cone product, from a mobile edifice. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Before the methods, systems and devices for producing a conditioned ice and/or frozen confection product are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "conditioned ice," "frozen confection," "shaved ice" and/or "snow cone" refer broadly to the large family of ice-based desserts or confections made from the fine shavings of ice or finely crushed ice. It will be appreciated that shaved ice and/or snow cones may often include a flavoring that may be a syrup or other sweetened condiment that is added to the shaved ice or snow cone. Similarly, the terms "ice shaving" or "snow cone" in reference to a machine are intended broadly to include all machines used to make or produce the large family of ice-based desserts or confections that may be classified as shaved ice or snow cone products.

As used herein, the term "edifice" is used to refer broadly to portable or mobile structures that generally form a boundary from which other structures can be attached and from which to provide frozen confections and/or flavorings.

As used herein "telescoping members" are intended to convey mechanical structures that facilitate the opening and closing of the edifice.

As disclosed herein below, the disclosure provides an apparatus, system and method for providing a topping dispenser or a plurality of topping dispensers on a mobile edifice for customer use, wherein the mobile edifice has an open position for use when dispensing product and a closed position for use when moving the edifice.

Referring now to FIG. 1, there is illustrated an embodiment of a system for distributing conditioned ice and/or frozen confections in an open and deployed position. Illustrated in FIG. 1 is a back view of an implementation of a mobile frozen confection system 100 in accordance with the teachings and principles of the disclosure. The mobile frozen confection system 100 may comprise a mobile edifice 110 in the form of a cart having a body portion 112 from which to provide the conditioned ice and/or frozen confections and a top portion 114 that may be deployable from a closed position to an open position as described herein.

In the industry, it is common for vendors to sell confections at many locations from within a venue where access is limited, such that full sized vehicles are not practical. In other areas, there is simply insufficient space for a permanent building or other large vehicle or structures from which to sell confections. Accordingly, a mobile edifice that can be moved within a venue or provided in a limited space area that can be operated by one or two users may be desirable. In addition, a mobile edifice that can be deployed quickly would give vendors an advantage in meeting demand as events change at a venue, or as venues themselves change.

The mobile edifice 110 may be a mobile edifice of any type that may be manually positioned, or may be attached to a vehicle of any type for positioning the edifice at a venue. Thus, it is within the scope of this disclosure to include a mobile edifice that may connect to a self-powered vehicle, such as sleds, snowmobiles, boats, ATVs, service vehicles, trailer movers, motorcycles, and the like. Mobile edifices 110 may also be pushed, towed, dropped, and floated into place using a powered vehicle. The mobile edifice 110 may be self-powered, and may include such things as power jacks, shacks, kiosks, booths, tables, coolers, umbrellas, and the like.

Continuing to refer to FIG. 1, the top portion 114 of the mobile edifice 110 may be configured to have a storage compartment 116 that may be vertically located above an ice shaving machine 130. The storage compartment 116 may comprise a top cover 117 and an upper shelf 118 between which items may be stored, such as topping containers 119, cups, napkins, straws, spare parts, and the like, may be stored. In an implementation, the topping containers 119 may be stored in the top storage compartment 116 in a predetermined order for the sake of efficiency, such that a user may move like toppings vertically downward when a lower topping container has been emptied. It will be appreciated that the containers may be stored with or without the liquid toppings therein without departing from the scope of the disclosure.

It will be appreciated that the mobile edifice 110 may provide surfaces and structures to mount a liquid topping dispensing system 120 and ice conditioning machine 130. The surfaces may be substantially horizontal surfaces. An implementation of the disclosure may comprise a topping dispenser 120 or a dispensing system for providing toppings to the conditioned or treated ice disposed about the perimeter of the mobile edifice body portion 112. Toppings may be liquid and/or may be solid pieces configured for dispensing. The toppings dispenser 120 may comprise a plurality of spouts 123 mounted on a framework such that a plurality of toppings can be dispensed or offered simultaneously to a single user or a plurality of users. The plurality of spouts 123 may correspond to a plurality of topping containers 119, wherein the topping containers 119 are in fluid communication with the plurality of spouts 123 via tubing 122. The topping containers 119 may be disposed remotely from the spouts 123 on the mobile edifice body portion 112 or in the top storage 116, such that the spouts may be located relatively close together for convenience. In an implementation, each spout 123 may correspond and attach with tubing 122 to a single container 119. In an implementation, one container 119 may correspond and be attached with tubing 122 to a plurality of spouts 123. In an implementation, the spout 123 and its corresponding container 119 may be connected by tubing 122 to provide fluid communication between them. It will be appreciated that the tubing 122 may be flexible.

In an embodiment, tubing 122 may extend from the topping containers 119 to dispensing spouts 123, which may be located beneath the topping containers 119. It will be appreciated that the liquid topping dispenser 120 is shown in FIG. 1 as having a plurality of spouts 123 and disposed on a plurality of locations on the mobile edifice body portion 112. It will be appreciated that with a plurality of dispensing locations, customers may be provided with greater access for topping their own frozen confections with flavoring syrups or other toppings. In an implementation, a plurality of jugs or containers 119 containing flavoring, flavoring syrups or other toppings may be located immediately above and adjacent to the plurality of spouts 123. In an implementation, there may be a one-to-one correspondence between a spout 123 and a jug or container 119. In an implementation, there may be one jug or container 119 for a plurality of spouts 123, such that a single jug or container 119 may feed a plurality of spouts 123. It will be appreciated that in an implementation, a plurality of jugs or containers 119 and a plurality of spouts 123 may be located on opposing sides of the ice conditioning shaving machine 130, as illustrated in the figure. In an implementation, there may be two spouts 123 for every one jug or container 119, such that if there are 5 jugs or containers 119, then there will be 10 corresponding spouts 123.

The plurality of spouts 123 may be attached to a backsplash 124. The backsplash 124 may be attached to a drip catch 125 and collection area for receiving excess or spilled flavorings or toppings. The drip catch 125 collection area may comprise a drain for removing the excess or spilled flavorings or toppings from the collection area.

Figure 2:
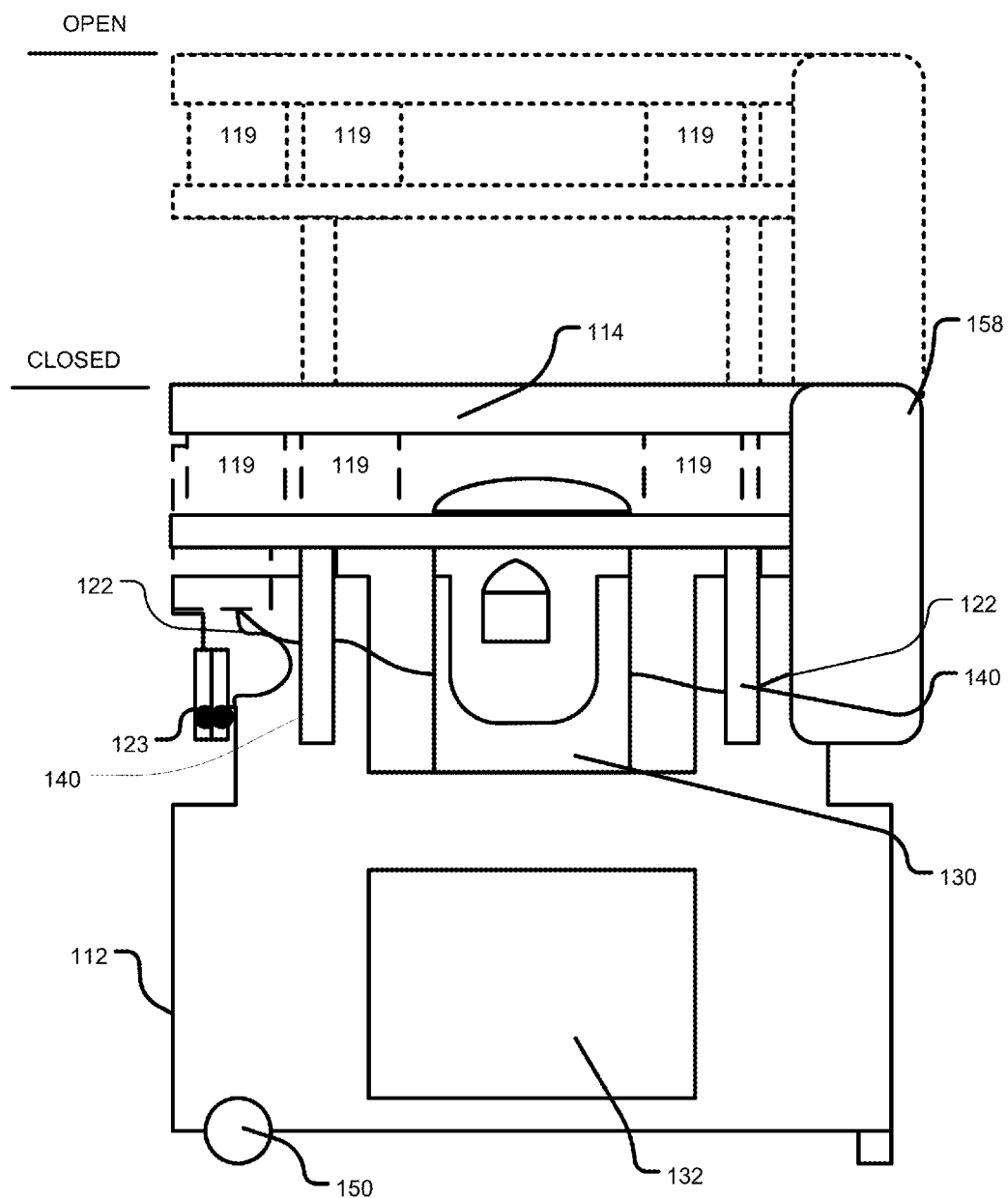
FIG. 2 illustrates a mobile edifice that has been telescopically compressed for mobility in accordance with the teachings and principles of the disclosure.

An implementation may further comprise a frozen confection machine 130 disposed within the mobile edifice 110 for providing conditioned or treated ice for confectionary use. A frozen confection machine 130 may condition or treat ice into a snow like edible form that may be topped with a topping. The frozen confection machine 130 may be of a type disclosed in U.S. patent application Ser. No. 13/414, 170, such an ice shaving machine for shaving a block of ice; and U.S. Pat. Nos. 6,908,053 (Rupp), such as an ice shaving machine having a band blade, hopper and scraper, and 6,527,212 (Rupp), such as an ice shaving machine having a band blade and spout system, all of which are hereby incorporated by this reference in their entireties. The frozen confection machine 130 may be portably powered by batteries 132 stored within lower storage 134 of the mobile edifice body portion 112. In an implementation, the frozen confection machine 130 may be powered by electricity using a power cord that may be plugged into an outlet or generator. As illustrated in FIGS. 1 and 2, the frozen confection or ice conditioning machine 130 may sit within the body portion 112. As illustrated, the frozen confection machine 130 may be located between the plurality of topping containers 119 when the top portion 114 is in an open position (illustrated best in FIG. 1) and in a closed position (illustrated best in FIG. 2). The frozen confection machine 130 may be stored at least partially within the top portion 114 when the top portion 114 is in the closed position.

As can further be seen in FIG. 1, the mobile edifice 110 may further comprise one or more or a plurality of telescoping members 140 disposed between the top portion 114 and the body portion 112 of the mobile edifice 110. The telescoping members 140 facilitate the lowering of the top portion 114 relative to the mobile edifice body portion 112. The compacting of the mobile edifice 110 may facilitate ease of moving the mobile edifice 110 and improve safety as the mobile edifice 110 becomes less top heavy when in the fully compacted or closed position (as seen in FIG. 2 in solid lines). It should be noted that the telescoping members 140 may be any mechanical device or structure that allows for compacting the height of the mobile edifice 110. In an embodiment, the telescoping members 140 may slide within each other, or may slide relative to each other. In an implementation, the telescoping members 140 may provide lateral fixation between the top portion 114 and the body portion 112, while allowing the telescoping members 140 to expand and contract linearly in a vertical manner, such that the top portion 112 does not substantially move laterally or become unstable with respect to the body portion 112. Additionally, rollers 150 or wheels may be added to ease the mobility of the edifice 110. It will be appreciated that the rollers 150 or wheels may comprise a roller lock 155 and may be lockable to prevent the rollers or wheels from rolling or moving, thereby creating a more stable edifice 110.

An implementation may further comprise signage 158 that may securely cover portions of the mobile edifice body portion 112 when in a closed or un-deployed position. The signage may be used to advertise or provide pricing or the like.

Referring now to FIG. 2, in an implementation, the edifice or mobile edifice 110 may be deployed (as shown in dashed line) in an open position. The edifice or mobile edifice 110 may also be un-deployed (as shown in solid lines) in a closed position so as to protect the edifice 110 during transport and times of non-use or non-business. The deployment of the mobile edifice 110 may use telescoping members 140 allowing the mobile edifice 110 to be opened or deployed from a closed position to an open position and from an open position to a closed position. The dashed line structures illustrate the top portion 114 in the open/dispensing position, while the solid line structures illustrate the top portion 114 compacted down or fully compressed onto the mobile edifice body portion 112.

It will be appreciated by those in the art that tubing 122 that facilitates fluid communication between containers 119 and spouts 123 may be flexible in order better accommodate the deployment and un-deployment of the frozen confection system 100.

In an embodiment, and as illustrated in FIG. 2, the signage 158 may be configured so as to act as a security cover when in the un-deployed position thereby covering such components as the spouts 123, ice conditioning machine 130, toping containers 119, etc. Additionally, an implementation may further comprise a cover that may be configured to cover a plurality of spouts 123 while the mobile edifice 110 is closed and not in commercial use or is in transit. As discussed above, a signage 158 structure may be provided, such that it may cover and protect the topping spouts 123 during travel or while closed.

Figure 3:
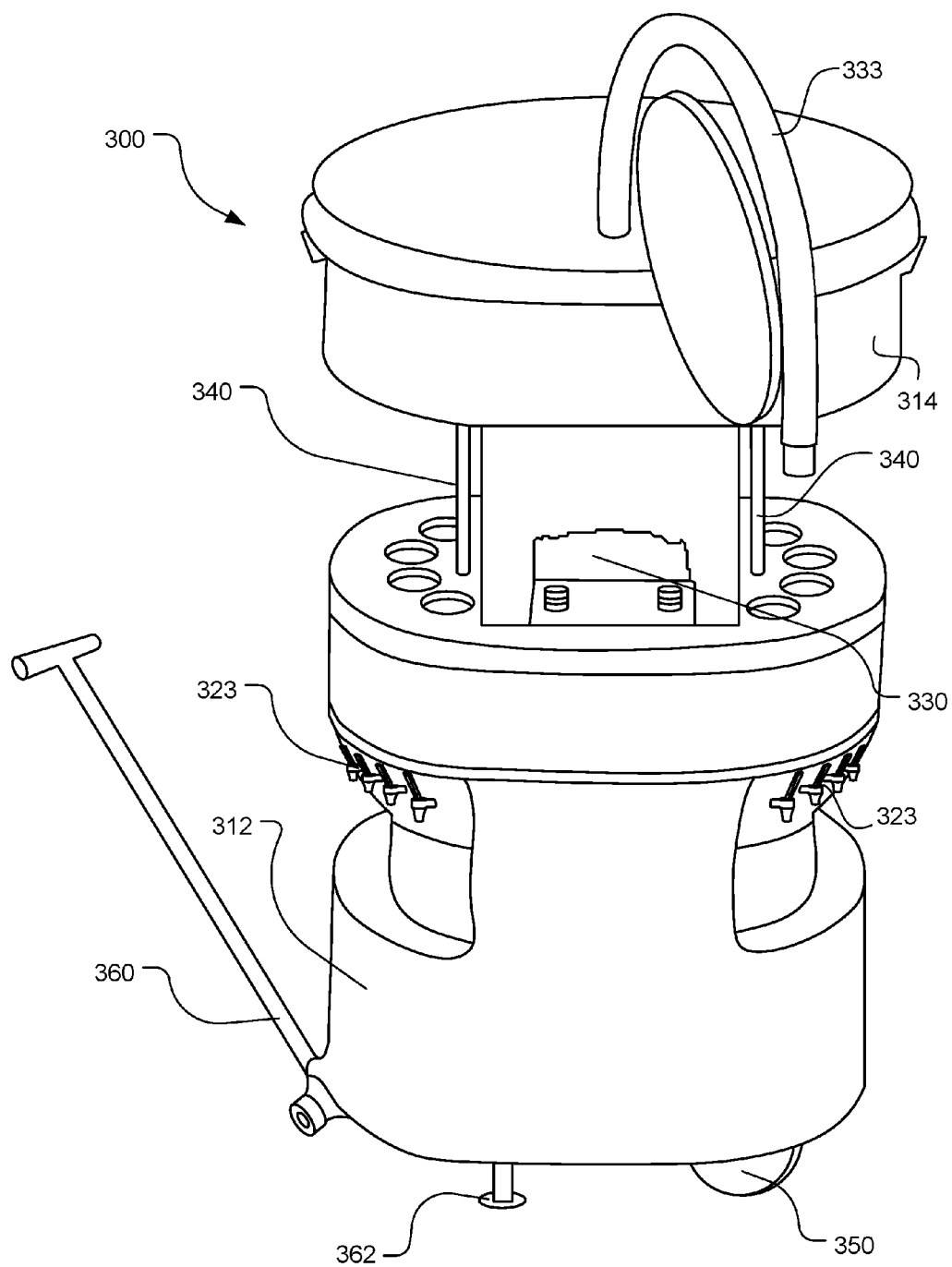
FIG. 3 illustrates a front view, or customer side view, of an implementation of a mobile edifice for producing a conditioned ice and/or frozen confection product having a telescoping top in accordance with the teachings and principles of the disclosure.

FIG. 3 illustrates an implementation of a mobile edifice 300 for distributing frozen confections. The mobile edifice 300 may comprise a topping dispenser for topping conditioned ice, shaved ice, and/or snow cone product in accordance with the teachings and principles of the disclosure. Also illustrated in FIG. 3 is a portable, deployable signage display 333. The signage display 333 may be conventional or electronic without departing from the scope of the disclosure. The deployable signage 333 may also be removed and used as a cover in an implementation or may be secured in a storage compartment when un-deployed. For example, the size and shape of the deployable signage 333 may be chosen to correspond to a portion of the mobile edifice 300 that needs to be covered when the edifice is un-deployed. As discussed above, a mobile edifice 300 may comprise a top portion 314 and a body portion 312 that are connected by telescoping members 340. As can be seen in the figure, an ice conditioning machine 330 may be used with the mobile edifice 300. Rollers 350 may provide ease of mobility, and in conjunction with a positioning handle 360, may provide convenient maneuverability for the mobile edifice 300. A foot 362 may also provide stability for the mobile edifice 300 and may provide a leveling functionality for the mobile edifice 300.

Figure 4:
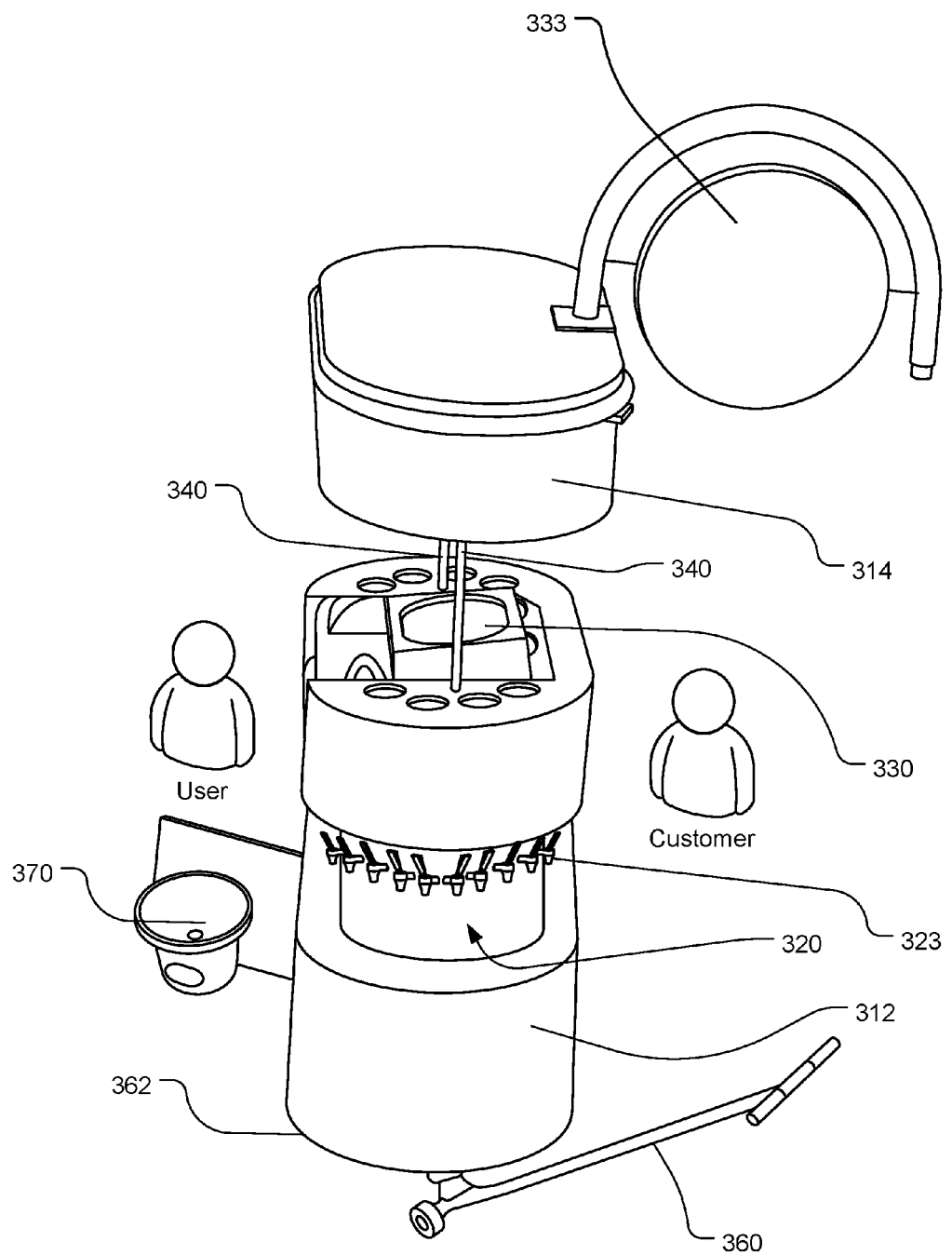
FIG. 4 illustrates a side view of an implementation of a mobile edifice for a conditioned ice and/or frozen confection product having a telescoping top and deployed signage in accordance with the teachings and principles of the disclosure.

FIG. 4 illustrates a substantial side view of an implementation of a mobile edifice 300 and a topping dispenser 320 for producing a conditioned ice or snow cone product in accordance with the teachings and principles of the disclosure. The mobile edifice 300 may comprise lighting illumination, such as analog or digital sources, and as discussed above may also comprise a deployable signage display 333. The signage display 333 may be conventional or electronic without departing from the scope of the disclosure. The deployable signage 333 may also be removed and used as a cover in an implementation or may be secured in a storage compartment when un-deployed. For example, the size and shape of the deployable signage 333 may be chosen to correspond to a portion of the mobile edifice 300 that needs to be covered when the edifice is un-deployed. As discussed above, a mobile edifice 300 may comprise a top portion 314 and a body portion 312 that are connected by telescoping members 340. As can be seen in the figure, an ice conditioning machine 330 may be used with the mobile edifice 300. Rollers 350 may provide ease of mobility, and in conjunction with a positioning handle 360, may provide convenient maneuverability for the mobile edifice 300. A foot 362 may also provide stability for the mobile edifice 300 and may provide a leveling functionality for the mobile edifice 300.

One skilled in the art will appreciate that the positioning handle 360 may additionally operate as a leverage device, such as a jack, such that operation of the positioning handle 360 lifts the mobile edifice 300 there by unweighting the foot 362 and allowing the mobile edifice 300 to be moved with relative ease.

Additionally, in an embodiment of a substantially self-contained mobile edifice 300, the edifice 300 may comprise plumbing elements 370. The plumbing elements may be or may comprise a catch basin/sink and a faucet. The plumbing elements 370 will be discussed in greater detail below in reference to FIG. 5.

As can be seen in FIG. 4, a user such as a worker, vendor, sales person, food handler, etc. will generally be on the user side of the mobile edifice 300 so as to have access to the ice conditioning machine 330, the plumbing elements 370, a cash register, storage, and other items needed when selling frozen confections. In an embodiment, customers will normally be relegated to a customer side with access to the topping dispenser 320 or plurality of toping dispensers 320.

Figure 5:
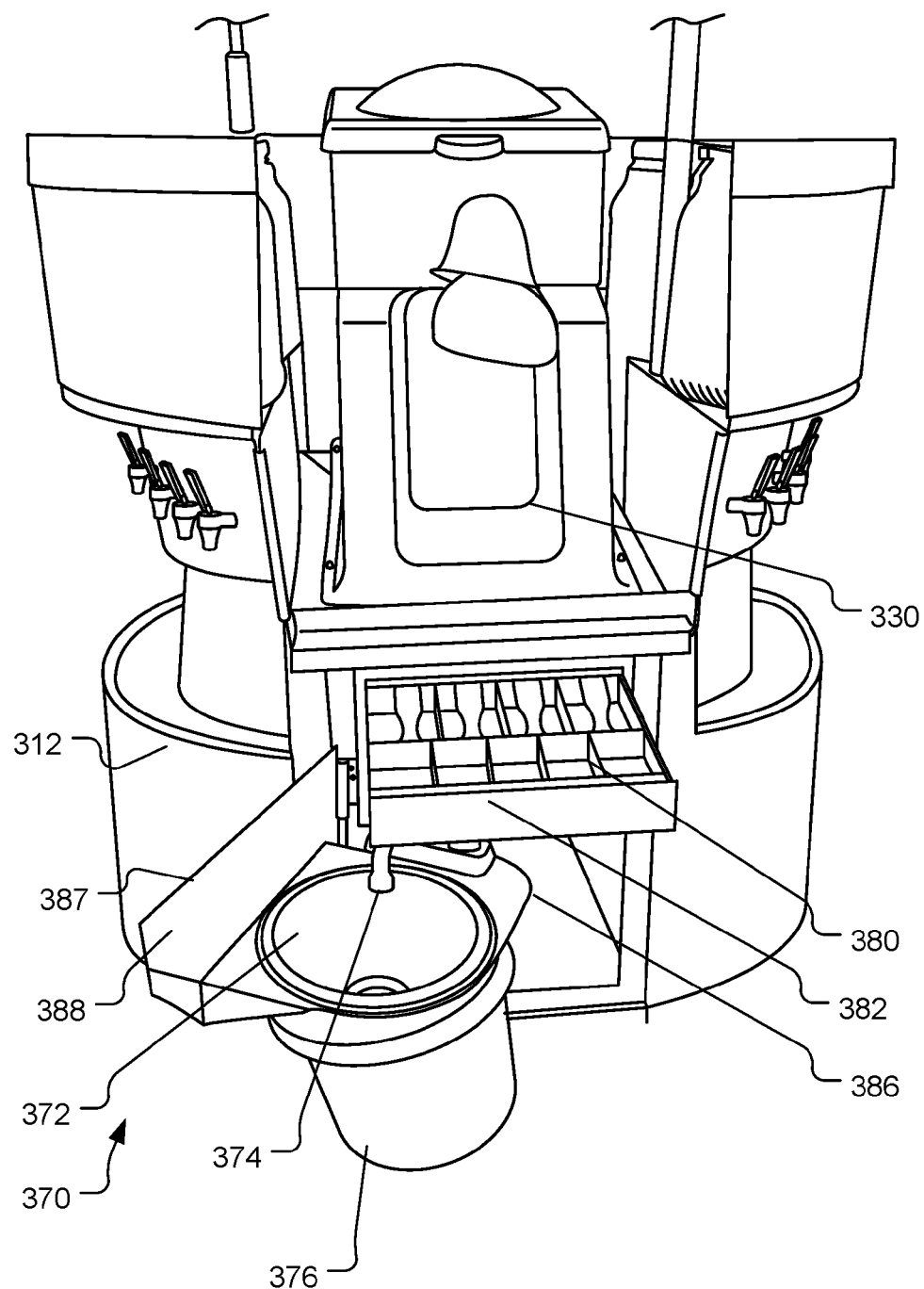
FIG. 5 illustrates a back view or user side view of an implementation of a mobile edifice with additional components for producing and selling a conditioned ice and/or frozen confection product in accordance with the teachings and principles of the disclosure.

Referring now to FIG. 5, an implementation of a user side of a body portion 312 of the mobile edifice 300 is illustrated. The user side may comprise a cash register 380 having a lock 382, and pluming elements 370 such as a sink 372, a faucet 374 and a liquid catch basin 376. In an implementation, the liquid catch basin 376 may be a portable retention tub for removing waste.

As illustrated in the figure, lower storage 386 may be provided in the body portion 312 that is accessible to a user. The lower storage 386 may be secured with a door 387 having a locking device 388. It will be appreciated that the mobile edifice 310 may be configured and arranged to allow the user with easy access to the ice conditioning machine 330. It will be appreciated that the cash register 380 may be any suitable structure for tendering a transaction, including running a credit card transaction and holding cash, checks, or other tender.

Figure 6:
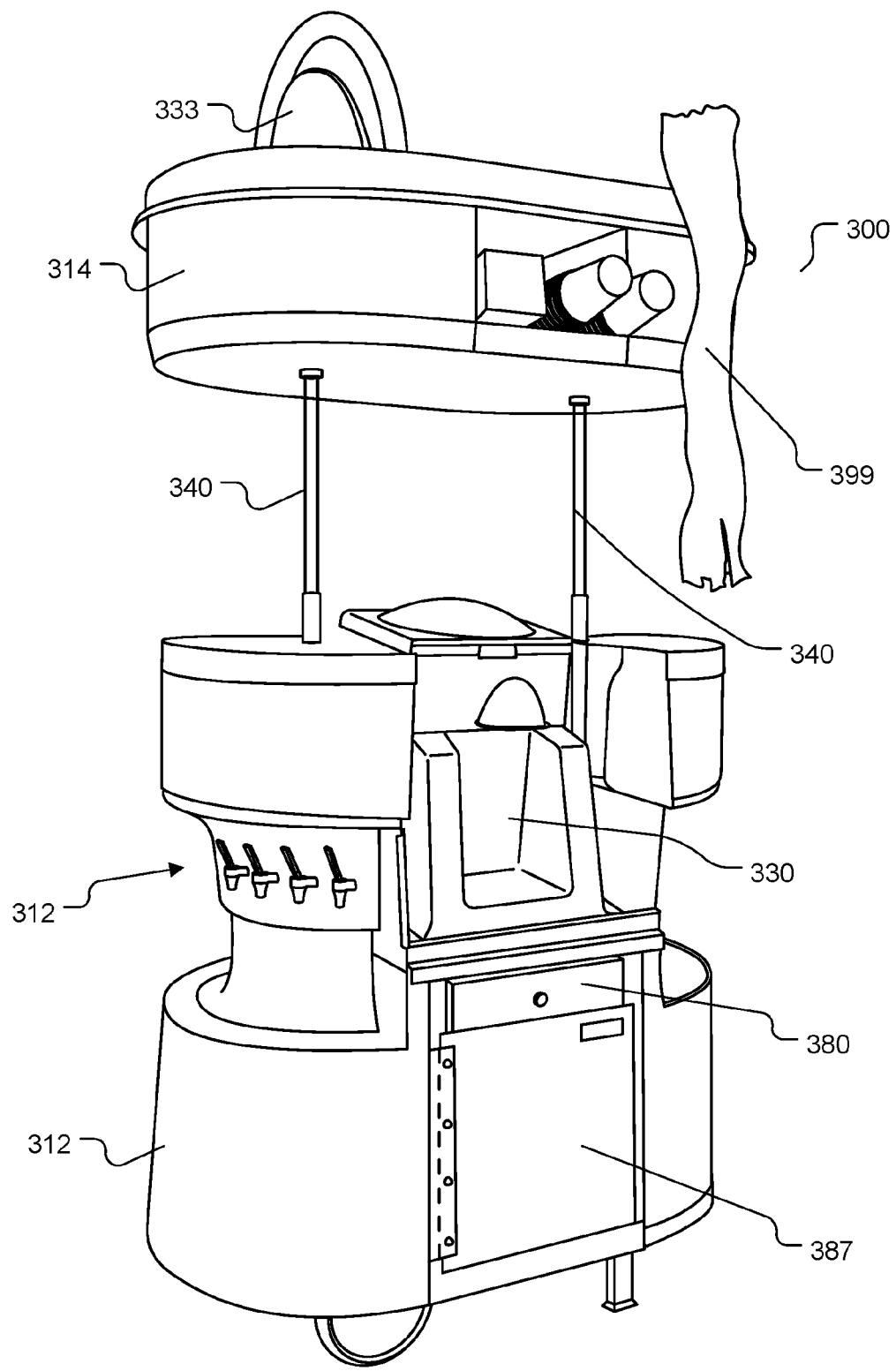
FIG. 6 illustrates a substantially back view of an implementation of a mobile edifice for producing a conditioned ice and/or frozen confection product in accordance with the teachings and principles of the disclosure.

FIG. 6 illustrates an implementation of a mobile edifice 300 and a topping dispenser 320 for producing a conditioned ice or snow cone product in accordance with the teachings and principles of the disclosure. The mobile edifice 300 may comprise an attraction device 399 such as a wind sock or other attention grabbing item, or other displays in order to grab customers' attention. The attraction device 399 may be or include such things as wind powered devices that require very little energy to activate. The attraction device 399 may incorporate motion or light or sound in order to attract the attention of penitential customers. The attraction device 399 may operate in conjunction with deployable signage 333 and may be attached to the mobile edifice 300 at the top portion 314 in a way that does not interfere with the operation of a topping dispenser 320, the ice conditioning machine 330, the cash register 380, the telescoping members 340, and the storage door 387.

An embodiment may comprise a mobile edifice body portion 312 that may also comprise storage therein for batteries, tools, ice, flavoring, and other items that may be immediately necessary for operation of the edifice. The storage may include insulation for storage of ice and/or batteries or other electrical equipment.

Additionally, an embodiment may comprise a cover that is connected to storage compartments and act as a cover for various components of the mobile edifice when the mobile edifice is compacted in to a closed position. The cover may also provide large surfaces for advertising and other signage for use when the mobile edifice is deployed and ready for business.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

An implementation of a mobile edifice may comprise a body portion comprising storage therein and surfaces for holding an ice conditioning machine and topping containers. The implementation may further comprise an attic storage portion located relatively vertically to the body portion.

An implementation may further comprise telescoping members disposed between and connecting the body portion to the storage attic whereby the entire edifice may be compacted by operating the telescoping members.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A mobile system for making conditioned ice confections comprising:
   a mobile edifice comprising:
      a body portion comprising:
         an enclosed storage compartment;
         a substantially horizontal work surface for holding an ice conditioning machine and a plurality of topping containers;
         a top portion located vertically with respect to the body portion;
         a roller disposed on the body portion;
         a plurality of telescoping members disposed between, and connecting, the body portion to the top portion, whereby the mobile edifice is configured to be compacted vertically by operating the plurality of telescoping members;
   an ice conditioning machine for producing conditioned ice; and
   a topping container for containing a topping for the conditioned ice;
   wherein the ice conditioning machine sits within the body portion between the plurality of topping containers when the top portion is in an open position and in a closed position, wherein the ice conditioning machine is stored at least partially within the top portion when the top portion is lowered to the closed position relative to the body portion by the telescoping members, such that the top portion is compacted vertically into the closed position.

2. The mobile system of claim 1, wherein the ice conditioning machine is configured to condition ice from a solid body of ice.

3. The mobile system of claim 1, wherein the ice conditioning machine is configured to condition ice from a plurality of bodies of ice in a hopper.

4. The mobile system of claim 1, further comprising a signage member disposed on the top portion and configured to provide coverage of a portion of the body portion when the mobile edifice is in a closed position.

5. The mobile system of claim 1, further comprising a storage compartment within the top portion.

6. The mobile system of claim 1, further comprising a roller lock configured to prevent the roller from moving or rolling.

7. The mobile system of claim 1, further comprising a locking mechanism for locking the enclosed storage compartment.

8. The mobile system of claim 1, further comprising a topping dispenser comprising a plurality of spouts for dispensing a plurality of toppings.

9. The mobile system of claim 8, wherein the topping dispenser further comprises a drip-catch for catching topping waste.

10. The mobile system of claim 1, further comprising a positioning handle for positioning and driving the mobile edifice.

11. The mobile system of claim 1, further comprising a liquid catch basin.

12. The mobile system of claim 11, wherein the liquid catch basin is detachable from the mobile edifice.

13. The mobile system of claim 1, further comprising a faucet.

14. The mobile system of claim 1, further comprising deployable signage.

15. The mobile system of claim 1, further comprising a cash register.

16. The mobile system of claim 1, further comprising one or more of a wind sock, a wind powered display, and a device that incorporates motion, light and/or sound for attracting customers.

17. The mobile system of claim 1, further comprising batteries for powering components of the system.

18. The mobile system of claim 1, further comprising a power cord for powering components of the system.

19. The mobile system of claim 8, further comprising a plurality of topping containers and flexible tubing, wherein the flexible tubing is disposed between each of the plurality of topping containers and a corresponding spout to provide fluid communication between the plurality of topping containers and the plurality of spouts.

20. The mobile system of claim 1, further comprising a plurality of topping containers.

21. The mobile system of claim 20, further comprising flexible tubing that provides fluid communication between the plurality of topping containers and a plurality of corresponding spouts that is part of a toppings dispenser.

22. The mobile The system of claim 1, further comprising a positioning handle that provides leverage for use in moving the mobile edifice from one location to another.

* * * * *